March 6, 1956 H. W. SCHRAMM ET AL 2,737,380
METHOD OF OPERATING A FORGE FURNACE
Filed April 2, 1952 2 Sheets-Sheet 1

INVENTOR.
H. W. Schramm
J. D. Nesbitt
BY
Charles J. Haughey
Agt.

March 6, 1956  H. W. SCHRAMM ET AL  2,737,380
METHOD OF OPERATING A FORGE FURNACE
Filed April 2, 1952  2 Sheets-Sheet 2
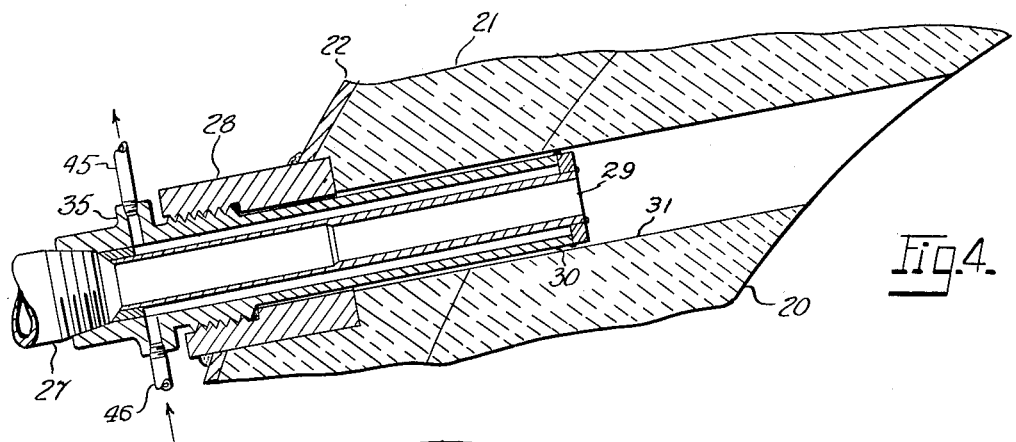
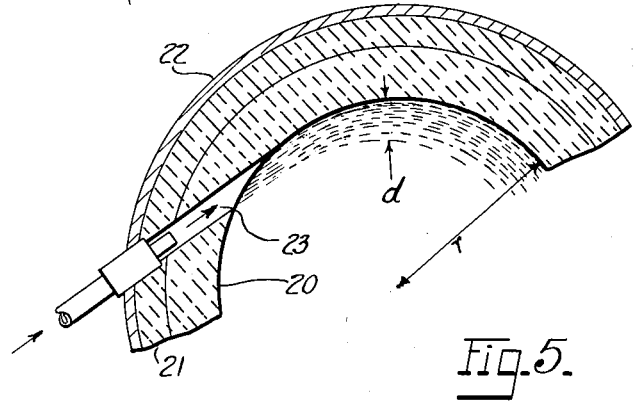
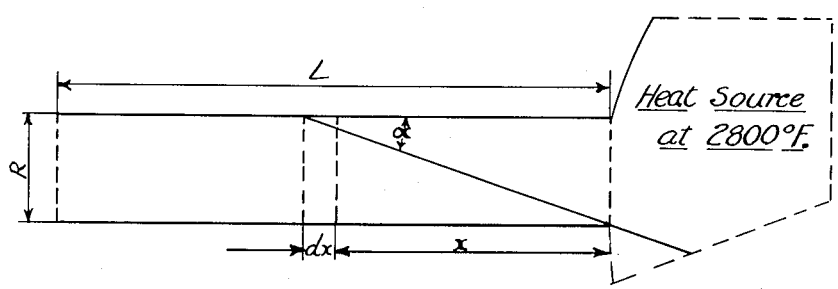
INVENTOR.
H. W. Schramm
J. D. Nesbitt
BY
Charles S. Haugh

United States Patent Office 2,737,380
Patented Mar. 6, 1956

2,737,380
METHOD OF OPERATING A FORGE FURNACE

Henry W. Schramm, Toledo, and John D. Nesbitt, Sylvania, Ohio

Application April 2, 1952, Serial No. 280,048

5 Claims. (Cl. 263—52)

This invention relates to a fuel heated forge furnace for use in plants where the work pieces are shaped between forging dies, and to a method of burning fuel and heating work therein. This application is a continuation-in-part of our application Serial No. 35,922 filed June 29, 1948, now abandoned. The general object is to provide a super fast forging furnace wherein the work pieces may be heated to working temperature within the shortest possible time and with a minimum of scale and local overheating of the work.

While the importance and high efficiency of radiation heat transfer for rapid heating to forging temperatures in fuel fired furnaces is well known, the efficacy of convection heat transfer at high temperatures has been generally underestimated and consequently little utilized in commercial designs. Consequently high thermal head heating in fuel fired furnaces is materially less effective than is inherently possible.

It is known to use tangentially placed tunnel burners in a cylindrical furnace, but such burners are designed to sufficiently reduce gas velocity to fully ignite and very substantially burn the fuel within the tunnel itself, discharging low velocity, almost completely burned, gases into the furnace chamber. This results in extremely hot tunnels, hot spots next adjacent the tunnels on the furnace wall, and a very limited maximum heat release within the furnace chamber which arises from the fact that at fuel rates in tunnel burners substantially over rated capacity, the tunnels "blow off," delivering a long flame into the furnace at such a velocity that the fuel no longer is heated to ignition temperatures before it leaves the tunnels. Often the furnace chamber becomes smoky, further preventing the heating and burning of the fuel in the furnace, and actually cooling the furnace while great quantities of burning fuel are discharged from the furnace.

By utilizing a new method of combustion in a furnace, together with an appropriate furnace design, it is possible to obtain more efficient and more rapid heating of work than heretofore while using the same or lower maximum furnace wall temperature.

For a consideration of what we believe to be novel and our invention, attention is directed to the following portion of the specification and the drawings and concluding claims thereof.

In the accompanying drawings forming part of this specification,

Fig. 4 is a view of alternate means for introducing aerated fuel into the furnace chamber.

Fig. 5 is a diagram utilized to illustrate the method of the invention.

Fig. 6 is a diagram used to illustrate a calculation in the specification.

According to this invention a cylindrical work heating furnace is heated by delivering a fully aerated fuel and oxidant mixture to ports in the cylindrical wall of the furnace at a sufficiently high velocity in a given case to introduce the mixture into the furnace chamber tangentially to its walls and in an unburned and substantially unignited condition, whirling the mixture in the furnace chamber to provide that the fuel burns only on the wall of the furnace to constitute the wall a source of radiant heat, and to provide a source of flue gases at substantially wall temperatures which by contact with work in the central portion of the furnace transfers heat thereto and leaves the furnace at less than furnace wall temperature.

The furnace illustrated comprises a circular tunnel 10 which will ordinarily be supported on horizontally disposed rails 13 atop supporting pillars 14, the tunnel having lateral arms 12 which rest on said rails. The tunnel is anchored at one end to the supporting frame of which the pillars 14 form a part, the balance of the tunnel being free to move on said rails by thermal expansion.

Figure 1:
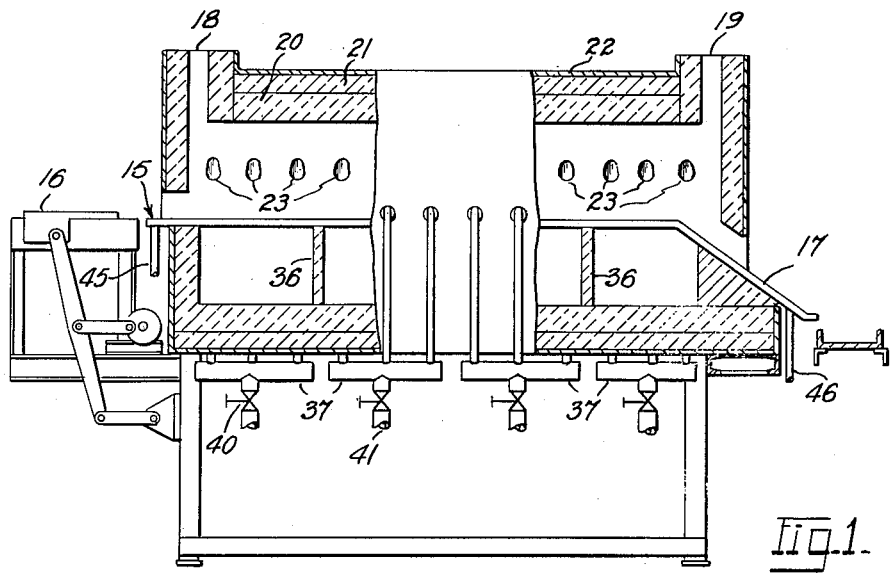
Fig. 1 is a longitudinal vertical section of a furnace embodying the present invention.
Figure 2:
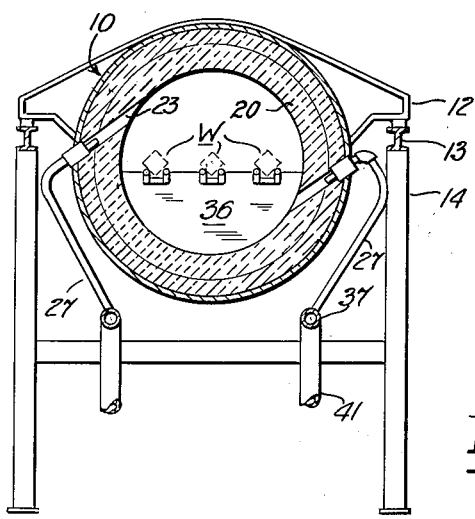
Fig. 2 is a transverse sectional view of the improved furnace.

The work pieces W to be heated are passed through the furnace chamber at a level which is substantially midway between the top and bottom side of the heating chamber. The means for supporting the work at such level comprises internally cooled supports generally indicated at 15, the supply pipe for cooling water being indicated at 45 and the waste outlet pipe at 46. The charging end of the furnace is at the left as viewed in Fig. 1, and the work pieces are fed into the furnace by a reciprocating pusher head 16 in front of which the work pieces are placed, by hand or otherwise. The heated work pieces exit from the furnace on a downwardly inclined support 17. The flue gases exit from the furnace through front and rear vertical flues 18 and 19.

The inner lining 20 of the tunnel 10 is comprised of a high temperature refractory having heat insulating properties. However, a layer of heat insulating material 21 will ordinarily be interposed between said lining and the steel casing 22 of the tunnel 10. Fully aerated gaseous fuel is preferably employed to heat the exposed surface of said lining to elevated temperature, the lining having a plurality of tangential fuel inlet ports 23 for this purpose so that the fuel will wash said surface and burn in contact therewith. It is noted that the ports 23 are not burners in the ordinary sense of the term. They are merely inlet ports for the introduction of streams of oxidant and fuel into the circular refractory lined chamber and tangentially to the walls thereof in a manner such as to substantially preclude initiation of the combustion reaction until the oxidant and fuel are within the chamber and in contact with the refractory lining of the chamber.

The aerated fuel from the inlet ports 23 is delivered tangentially to the furnace wall inner lining 20 in an unignited condition and at a sufficient velocity to maintain a thin sleeve or layer of burning and unburned gases next adjacent the lining 20, as illustrated in Fig. 5. The thickness $d$ of this sleeve or layer of gases will be determined by many factors including initial velocity, temperature and density of the gases, radius of curvature, roughness and temperature of the inner lining 20 of the furnace wall, and the like.

Figure 3:
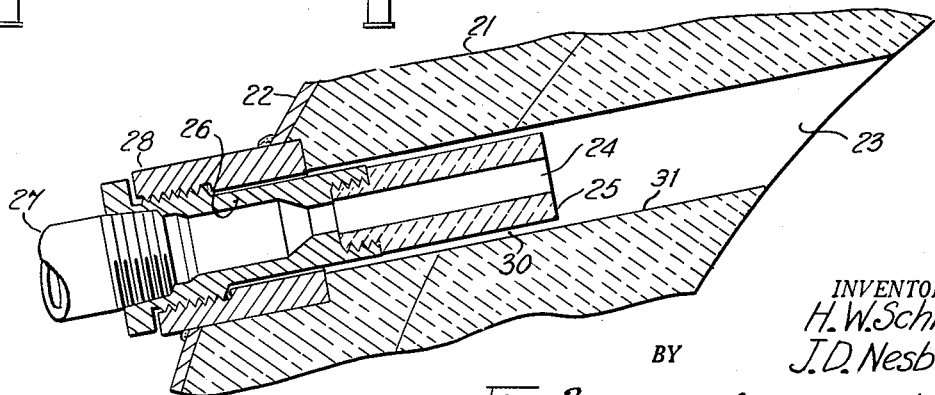
Fig. 3 is a view of means for introducing aerated fuel into the furnace chamber.

The means for delivering the aerated fuel under pressure to the inlet ports 23 comprises for each port the bore 24 of a nozzle 25 which may be of refractory material or a suitable high temperature alloy, the nozzle 25 projecting a short distance into said port. In Fig. 3 the nozzle is screwed into a metal holder 26 of which in turn is screwed into a metal boss 28 welded gas-tight to the metal casing 22. This manner of supporting the nozzle is optional. In Fig. 4 the nozzle 29 is internally cooled by water flowing through pipes 45 and 46 joined to holder 35.

Rather than try to maintain the joint between the nozzle 25 and the holder 26 gas-tight as by cement or packing, use is made of the partial vacuum which tends to prevail about the discharge end of the nozzle 25 due to the high velocity of the issuing stream of the aerated fuel from the bore 24 thereof for inducing any gas leakage at said joint to flow towards the discharge end of the nozzle, the latter for this purpose being spaced from the passage 31 whereinto it projects to for an annular space 30 therebetween. This annular space 30 also serves as clearance between the nozzle and the side walls of the passage into which it projects thereby reducing danger of breakage of the nozzle on account of contact with the sides of said passage. A supply pipe 27 delivers the aerated fuel under pressure to the outer end of said holder. The several fuel supply pipes 27 for the several fuel discharge nozzles 25 are connected in sets to individual fuel supply manifolds 37, thereby permitting ready control of the heat input to the furnace at longitudinal intervals or zones by control valves 40 individual to supply pipes 41 which deliver to said manifolds.

The work supporting means or skid rails 15 are supported at longitudinal intervals atop transversely extending walls 36 which also serve to prevent draft through the lower portion of the furnace and additionally serve to divide the lower portion of the heating chamber into longitudinal zones which are useful for heat control purposes.

The fuel and air mixture which enters the furnace chamber through ports 23 is preferably a fully aerated air-gas mixture. While the fully pre-mixed type of fuel supply system as shown is preferred, alternative nozzle mixing fuel gas and air nozzles may be used, and oil may also be delivered in a finely atomized state in a high velocity stream of air passing through the ports 23.

The fuel (fuel and oxidant) is delivered through the ports 23 in a high velocity stream tangential to the furnace wall and in a substantially unignited condition. The velocity of the entering fuel is so related to the port size and frequency in the furnace wall, together with the furnace chamber diameter, that the fuel is by centrifugal forces formed into a thin "sleeve" of gases next adjacent the furnace wall. As illustrated in Fig. 5, the thickness $d$ of the sleeve of gases, or the gas stream, is inversely proportional to the centrifugal force F acting on the gases; thus where A and $c$ are constants, $$F=\frac{A}{d^c}$$

The centrifugal force is also directly proportional to the gas density, or mass, $g$ and to the square of the linear velocity $v$ of the gas, and is inversely proportional to the radius of curvature $r$. Hence, where B is a constant, $$F=\frac{Bgv^2}{r}, \text{ so } F=\frac{A}{d^c}=\frac{Bgv^2}{r}$$

or $$d^c=\frac{A}{B}\cdot\frac{r}{gv^2}$$

The constant $c$ is believed to be close to unity. These relationships are generally true for equilibrium conditions, but may be expected to vary somewhat here due to the dynamic nature of the continuing combustion reaction. They do show that a relatively high velocity stream of gases entering a cylindrical furnace tangentially to its walls will be formed into a relatively thin stream adjacent the walls much in the manner of a centrifuge or "cyclone" gas separator.

Immediately upon entering the furnace chamber, the portion of the fuel in the stream next adjacent the inner lining 20 will be scrubbing thereagainst become heated to ignition temperature and will rapidly burn in contact therewith. By burning in this way in such intimate contact with the furnace wall, the actual thickness of the burning stream is kept at a minimum, and heat is rapidly transferred from the burning fuel gases to the refractory wall, largely by convection—it being well known that radiation of heat from substantially diathermanous gases even at high temperatures is relatively small as compared with the radiation obtained from solid bodies. As the now burned portion of the fuel stream is displaced from next adjacent the furnace wall by the still relatively cold and therefor heavier unignited fuel in the fuel stream, it leaves the wall at substantially wall temperature, fully burned, and is displaced towards the center of the furnace where it scrubs the work on its way axially through the furnace chamber to the flues at the ends of the furnace.

Extremely high inlet fuel stream velocities permit delivery of unignited fuel into the furnace chamber, and because of the low emissivity of such gases it is possible to maintain a whirling sleeve of fuel in the furnace in which only that portion next adjacent the hot refractory inner lining 20 is heated to ignition temperature and thus made to burn. Since all combustion is thus made to take place on the furnace wall where the heat released is immediately transferred to that wall, the entire inner wall of the furnace is raised to a maximum and uniform temperature and the fuel stream leaving the wall after combustion thereagainst is substantially at wall temperature. Maximum radiation heat transfer to the work from the entire solid wall is thus obtained, and high velocity convection heat transfer to the work from burned gases at wall temperature is obtained from gases en route to the flues. It is thus possible to discharge flue gases from a high thermal heat forge furnace at substantially less than wall temperature.

It is an important feature of this invention that the fuel supply nozzles deliver the fuel and air to the inlet ports at a sufficient velocity to avoid substantial ignition within those ports, thus delivering the fuel and air to the furnace tangentially to the wall, unburned and substantially unignited, and providing next adjacent the refractory wall of the furnace a thin, high velocity stream of burning gases which scrub against the refractory furnace wall and heat it, constituting that wall a source of uniform radiant heat for heating work in the central portion of the chamber. This is distinguished from conventional practice of heating such furnaces by application of tunnel burners in which the fuel is thoroughly ignited within the tunnel and is either fully burned in the tunnel or forms a relatively short, hot flame which tends to locally overheat the furnace walls.

There are at least three ways by which ignition of the fuel may be avoided or retarded in the fuel inlet port: 1, the inlet ports may be artificially cooled, or the nozzles therein may be artificially cooled, so that the oxidant and fuel cannot be heated to the ignition point within the port; 2, the port size may be so reduced and the entering pressure of the premixed fuel and oxidant so increased that the velocity of the stream thereof is too high for the stream to be heated to the ignition temperature within the port, and 3, the fuel and oxidant may be supplied in separate streams and mixed at or near the entrance to the heating chamber, usually in a nozzle near the outlet of the port. Items 1 and 3 are self explanatory, but item 2 may require some discussion, and is subject to calculation to determine its limitations. Since in the absence of extreme pressure conditions it is only the temperature of a given fuel and oxidant mixture that determines its ignition, it is possible to calculate the velocity of the fuel and oxidant stream in a given furnace port below which thhe stream will be heated to ignition.

If it is desired to maintain a furnace wall at 2800° F. by burning fuel on that wall rather than by combustion in tunnels of burners firing into the furnace chamber, and the fuel port has a diameter R and a length L, as illustrated in Fig. 5, then the velocity U of a given stream of fuel mixture therethrough which will allow that stream to just heat to ignition temperature may be calculated by conventional methods, and, of course, may be closely confirmed experimentally in any given case.

Under the conditions necessary to raise a furnace wall to 2800° F., the stream of gas passing through the port is heated by convection from the wall of the port, and that wall is heated by radiation through the port from the furnace chamber and, to a negligible degree, by conduction through the refractory furnace wall. The relative quantity of such conducted heat is so small as not to seriously affect the temperature in the gas stream, hence it is neglected in a practical calculation. By applying the well known radiation laws of Kirchoff and Lambert, and the law of inverse squares to the Stefan-Boltzman equation, the heat radiated from a closed chamber wall at 2800° F. through a port tube 2R diameter to a circumferential band element $dq$ of the tube wall at $x$ feet from the outlet of the port, can be calculated from the relationship:

$$dq = \frac{1730}{\pi}\left[3.26^4 - \left(\frac{T}{1000}\right)^4\right]\frac{1}{2}\sin\alpha \cdot 2\pi R\, dx \cdot \sin\alpha$$

where $$\sin\alpha = \frac{2R}{\sqrt{4R^2 + x^2}}$$

and perfect black body radiation is assumed.

Since this calculation is made to show the approximate limiting velocity required to avoid the gases being heated to ignition temperature the term $$\left(\frac{T}{1000}\right)^4$$

may be dropped from the equation. It can be shown that to insure the desired result T cannot greatly exceed 1060° F., or 1520° R. (the ignition temperature of hydrogen). Therefore the value of $$\left(\frac{T}{1000}\right)^4$$

will be always much less than $3.26^4$ and the difference, $$3.26^4 - \left(\frac{T}{1000}\right)^4$$

will approximate the value of $3.26^4$. Dropping the $$\left(\frac{T}{1000}\right)^4$$

term greatly simplifies the calculations without materially affecting the accuracy of them.

At steady state the heat radiated from the chamber to the port tube must equal the heat convected from the port tube to the gas.

Therefore $$dq = \frac{1730(3.26^4)4R^3}{4R^2 + x^2}\, dx = 2\pi Rh(T - Tg)\, dx =$$

Heat radiated to tube     Heat convected from tube $$= -0.2\pi R^2 U(3600)\, dTg$$

Heat absorbed by gas where $h$ is the heat transfer coefficient of the stream on the port wall, $Tg$ is the temperature of the gas stream, and $u$ is the stream velocity in feet per second.

The temperature of the gas stream is then $$Tg = \frac{4(1730)\, 3.26^4 R^3}{72u\pi R^2}\int \frac{dx}{4R^2 + X^2}$$

Where $x = L$ and $Tg$ is room temperature, or 520° R., $$Tg = 520 + \frac{1728}{u}\left(\arctan\frac{L}{2R} - \arctan\frac{x}{2R}\right)$$

Taking $h$ in B. T. U./sq. ft. hr. °F. $= 0.27\frac{u^{0.8}}{R^{0.25}}$ ("Industrial Heat Transfer" by Schack, Goldschmidt and Partridge, page 114) and setting $T = 1520°$ R.( the lowest ignition temperature for any common fuel) when $x = 0$, then $$115.1 R^{0.25} = \frac{1}{u^{0.2}}\left(u - 1.728 \arctan\frac{L}{2R}\right)$$

But $u - \arctan\frac{L}{2R}$ may be taken as $u$ because $\arctan$ $$\frac{L}{2R}$$

is much less than $u$, so $$377 R^{0.3125} = u$$

This therefore, gives the minimum velocity of the mixture thru the port tube which can be permitted if ignition is to be prevented within the port tube.

From the relation between R and U above calculated, with certain obviously reasonable assumptions, the following table may be calculated for the gas velocity, and gas pressure required to obtain that velocity, in the port.

| R (port radius, ft.) | U (cold basis, ft./sec.) | Pressure Required (lbs./sq. in.) |
|---|---|---|
| 1/48 (1/4") | 112 | 0.3 |
| 1/24 (1/2") | 140 | 0.4 |
| 1/12 (1") | 173 | 0.5 |
| 1/6 (2") | 215 | 0.8 |

The above table shows that where a ½ inch radius fuel-air port is used to deliver a stream of cold fuel to a 2800° F. furnace chamber, to avoid heating the gas stream above 1060° F. and consequently igniting fuel in the port (assuming no cold work in the furnace chamber "visible" to the port walls), the gas stream in the port must move at a velocity, cold basis, of 140 feet per second. A manifold fuel pressure of 0.4 pound per square inch is required to obtain such velocity.

For practical purposes a minimum velocity of about 100 feet per second is recommended, considering variations of port size, wall temperatures and operating conditions, variations from one fuel to another, and the fact that a slight ignition within the port will not seriously affect the performance of the combustion of the fuel on the wall of the furnace chamber itself.

In the foregoing calculations the minimum fuel stream velocity, cold basis, is calculated as a function of port diameter 2R, or radius R, by equating the rate at which heat is radiated to the mixture inlet port, or tube, in a steady state condition, to the rate at which that heat is convected from the tube wall by the mixture, and also to the rate at which that heat changes the stream temperature. It will be appreciated that the many variables, as well as the necessary assumptions, however reasonable, make such a calculation very difficult. However, when compared to conventional tunnel burner design wherein fuel mixtures do not exceed about ⅕ of the above calculated velocities or about 20 feet per second entering the tunnel, it is apparent that the prevention of ignition within a fuel inlet port, as distinguished from standard tunnel burner operation where such ignition is positively maintained, is a distinguishing feature of this improvement. In actual practice it is preferred to operate the furnace with mixture velocities in the inlet port of 2 to 3 times the minimum to avoid ignition and assure combustion only on the refractory wall of the furnace chamber.

The benefits derived from this improvement include uniform lining temperature, improved heat transfer to the work in the furnace chamber, less local overheating of the work, a system better adapted for use of pure oxygen enrichment or preheated air for combustion, and simplified construction.

By avoiding the hot spots usually found in furnaces on the furnace wall next adjacent tunnel burners tangentially fired into the furnace, the average furnace temperature is that of its hottest point. No refractory failure is due to local overheating by impingement of flame from a burner. There is no burner in the conventional sense. Limitations of high temperature refractory materials for furnace linings are therefore less serious, allowing higher furnace temperatures for high thermal head forge heating. Combustion of the unignited fuel-oxidant mixture is by no means instantaneous on even a 2800° F. wall because the mixture must be heated to ignition temperature and above to initiate and accelerate the combustion reaction. The result is a burning layer of mixture held to a path next adjacent the furnace wall by centrifugal force resulting from the initial velocity of the stream issuing from the inlet ports. Proper arrangement and sizing of the fuel inlet ports will provide a substantially continuous sheath of flame just inside the furnace wall, and a resultant uniform wall temperature.

The uniform furnace wall temperature allows the furnace wall to be from one to several hundred degrees Fahrenheit higher effective wall temperature than would otherwise be possible, as for example with conventional tunnel burners taught by the prior art. The rate of radiant heat transfer to work at 2200° F. from a wall at 2800° F. is about 109,000 B. t. u. per hour per square foot as against only about 65,000 for a 2600° F. wall temperature. Further, convection heat transfer from burned gases passing to the center of the furnace chamber, due perhaps to extremely high gas velocities, is very high. Convection heat transfer under these conditions follows roughly the relation $H=0.5V^{0.8}$ where H is the heat transfer coefficient and V is the velocity of the gas stream. Since in our example for calculation, the H value is 15 to 20 B. t. u. per hr. per sq. ft. per ° F., the estimated velocity in the center of the chamber next to the work to be heated is 70 to 100 ft./sec. Even these velocities are much greater than the nozzle velocities obtained from conventional firing, neglecting the further slowing effect of a combustion tunnel, and the time required to heat work to forging temperature is accordingly about 20% less due to such convection heat transfer.

The great uniformity of wall temperature, and the convection effects of uniformly heated products of combustion at wall temperature, as distinguished from burning gases, which are at combustion temperatures, tends to reduce overheating of thin sections, corners on the work, and the like, and the thin sleeve of burning gases formed in the chamber allows greater use of the heating chamber without disturbing combustion therein. The very thin stream leaving relatively small inlet ports, together with the effects of centrifugal force in further thinning the stream, causes combustion products to leave the furnace wall substantially at wall temperature, and as a result there is comparatively little overheating of the edges of square sectioned billets even though such billets are placed quite near the wall.

Since this improvement heats the entire furnace wall to uniform temperature, which wall is directly exposed to work to be heated, rather than concentrating a flame in a combustion tunnel, there is less tendency for the refractory to reach theoretical flame temperature, and heat is removed and transmitted to the work as it is generated. This reduces a severe limitation heretofore present because the furnace wall does not so nearly approach the theoretical flame temperature, but it can be of the same material as combustion tunnels. This means, in a practical sense, that it is now possible to reach higher combustion chamber temperatures for high thermal head heating than was heretofore possible.

The mechanical construction of inlet ports is much simpler, and the ports are smaller for admitting a given quantity of fuel, than heretofore known. Problems of protecting the hot end of the nozzles and avoiding overheating thereof are very greatly simplified, to the extent that it is now possible to use alloy steel nozzle tips for delivering substantially unignited fuel-air mixtures to very hot furnace combustion chambers.

This invention provides an apparatus and a method which makes more efficient use of the furnace wall as a source of radiant heat and of the flue gas products as a source of convection heat than heretofore known, and is thus well adapted to its intended purpose.

We claim:
1. The method of heating work pieces to hot working temperature, which comprises: first heating the inner surface of a refractory lined cylindrical heating chamber to uniform temperature substantially above the final desired temperature of the work pieces to be heated, by delivering through a plurality of tangential inlet ports extending end to end of said chamber a plurality of streams of fully aerated fuel at sufficient velocity to prevent substantial ignition and burning of the fuel in the ports and to form within the chamber a substantially continuous, relatively thin sleeve of burning gases next adjacent the lining to heat the same and constitute said lining a source of radiant heat tending to heat the work pieces to above the desired working temperature; and second advancing the work pieces through the central portion of the chamber within said sleeve of burning gases at a rate sufficient to discharge the work pieces at the desired working temperature.

2. The method of heating work pieces to hot working temperature, which comprises: first, heating the inner surface of a refractory lined cylindrical heating chamber to uniform temperature substantially above the final desired temperature of the work pieces to be heated, by delivering through circumferentially spaced rows of tangential inlet ports extending end to end of the chamber a plurality of streams of fully aerated fuel at sufficient velocity to prevent substantial ignition and burning of the fuel in the ports and to form within the chamber a substantially continuous, relatively thin sleeve of burning gases next adjacent the lining to heat the same and constitute said lining a source of radiant heat tending to heat the work pieces to above the desired working temperature; and second, advancing the work pieces axially through the center of said chamber and within the sleeve at a rate sufficient to discharge the work pieces at the desired working temperature.

3. The method according to claim 1 wherein the fuel is introduced through two rows of tangential inlet ports extending end to end of the chamber, said rows being diametrically opposed to each other.

4. The method according to claim 1 which comprises: initially heating the inner surface of the lining to temperatures substantially above the ignition temperature of the fuel to be burned in the chamber; and subsequently delivering fuel through said tangential inlet ports at high velocities, igniting and burning said fuel on the inner surface of the lining, and forming within the chamber said sleeve of burning gases.

5. The method according to claim 1 wherein the ports are of one inch diameter and the fuel leaving said ports moves at a linear velocity of about 100 feet per second.

References Cited in the file of this patent

UNITED STATES PATENTS

| | | |
|---|---|---|
| 311,017 | Logan | Jan. 20, 1885 |
| 1,349,319 | Carrey | Aug. 10, 1920 |
| 1,946,971 | Harter | Feb. 13, 1934 |
| 2,215,983 | Smith | Sept. 24, 1940 |
| 2,564,700 | Krejci | Aug. 21, 1951 |
| 2,570,554 | Henwood | Oct. 9, 1951 |
| 2,589,811 | Holcroft | Mar. 18, 1952 |

FOREIGN PATENTS

| | | |
|---|---|---|
| 11,956 | Great Britain | A. D. 1913 |
| 136,356 | Great Britain | Dec. 18, 1919 |

OTHER REFERENCES

Pages 306, 307 and 308 of "Fuels and Their Combustion" by Haslam and Russel. This text was published in 1926 by McGraw Hill Book Co., New York, N. Y.

Pages 338, 339 and 340 of Trinks' Industrial Furnaces, vol. II, second edition, copyright 1942. Published by John Wiley & Sons, New York, New York.